UNITED STATES PATENT OFFICE.

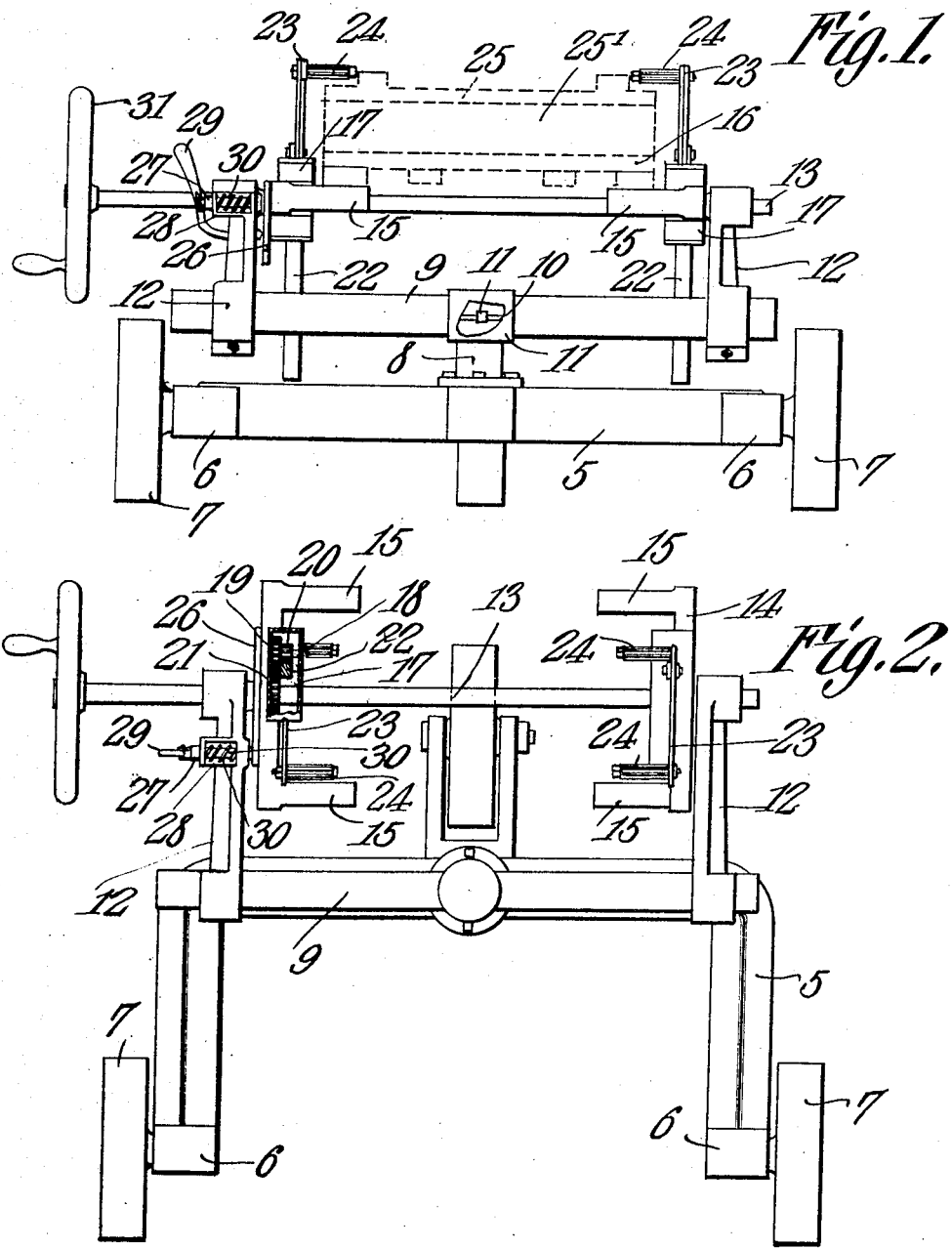

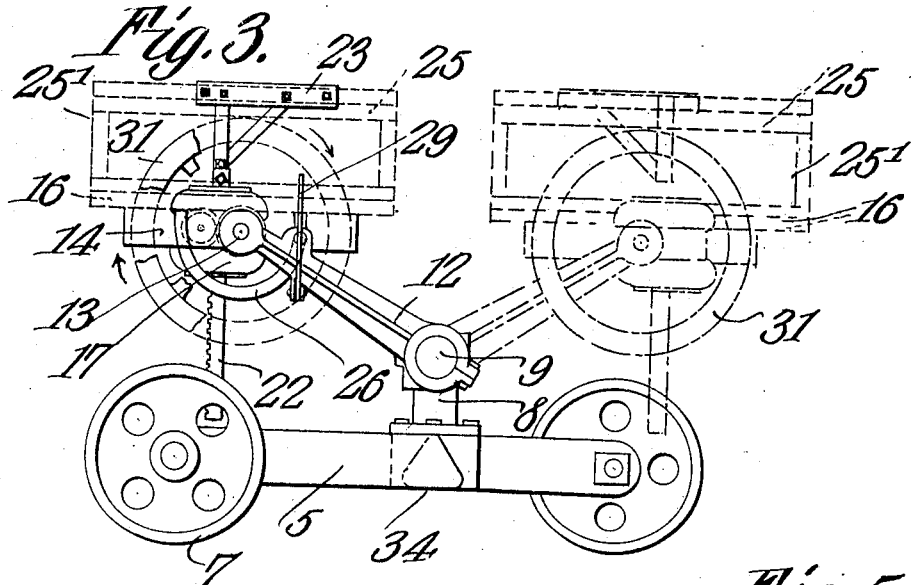
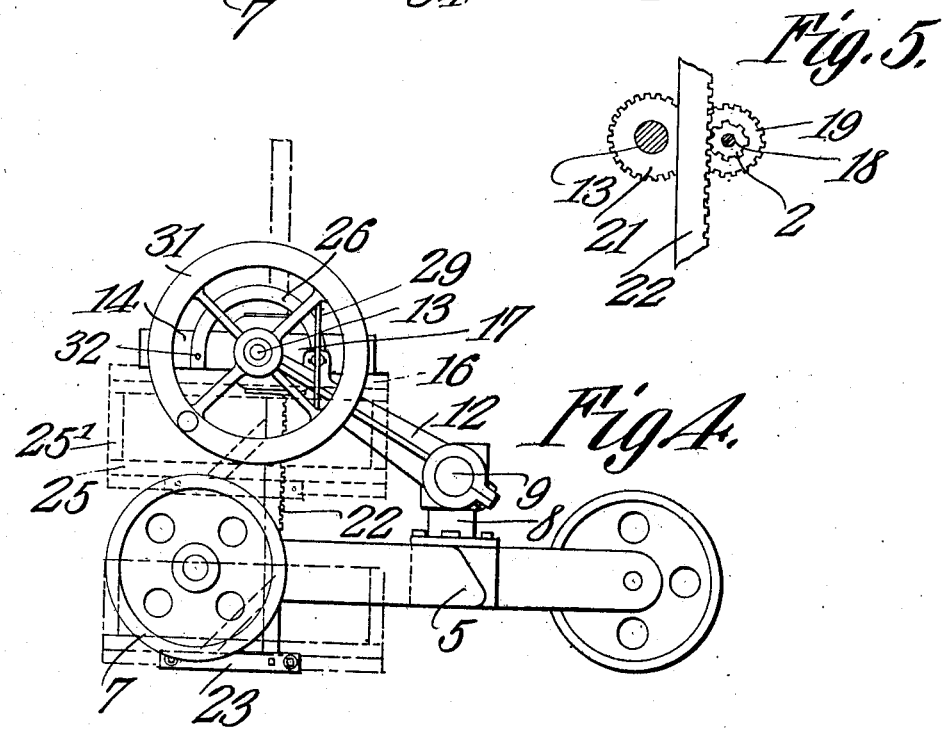

MAX KARL WEIGEL, OF DAVENPORT, IOWA, ASSIGNOR TO KILLING MOLDING MACHINE CO., OF DAVENPORT, IOWA.

MOLDING-MACHINE.

No. 916,511.  Specification of Letters Patent.  Patented March 30, 1909.

Application filed May 29, 1908. Serial No. 435,765.

*To all whom it may concern:*

Be it known that I, MAX KARL WEIGEL, a subject of Germany, residing at Davenport, in the county of Scott and State of Iowa, have invented a new and useful Molding-Machine, of which the following is a specification.

This invention relates to molding machines and has for its object to provide a strong, durable and thoroughly efficient machine of this character in which the flask is withdrawn from the pattern and deposited on the ground thereby to prevent breakage of, or injury to, the mold.

A further object of the invention is to provide a molding machine including a truck having a carrier secured thereto and mounted for rotation in a horizontal plane, said carrier being provided with a reversible table which forms a support for the flask.

A further object is to provide improved means for revolving the table, means for locking the table in different positions of adjustment, and means for lowering the flask or mold after the table has been reversed.

A still further object of the invention is generally to improve this class of machines so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a front elevation of a molding machine constructed in accordance with my invention. Fig. 2 is a top plan view of the same. Fig. 3 is a side elevation, the flask supporting table being shown in dotted lines in normal position and in full lines in position to be reversed. Fig. 4 is a similar view showing the manner of lowering the flask. Fig. 5 is a detail sectional view of the gearing for effecting the lowering of the flask.

Similar numerals of reference indicate corresponding parts in all of the figures of the drawings.

The improved molding machine forming the subject matter of the present invention includes a wheeled truck having a substantially U shaped supporting frame 5 the arms of which are provided with bearings 6 for the traction wheels 7. Extending vertically from the closed end of the frame 5 is a stud 8 upon which is mounted for rotation a transverse bar 9, said stud being provided with an annular groove 10 in which is seated a screw or similar fastening device 11 for preventing accidental displacement of the bar 9, while at the same time permitting the bar to rotate in a horizontal plane on the stud or bearing 8.

Keyed or otherwise rigidly secured to the opposite ends of the revolving bar 9 is a pair of arms 12 preferably arranged at an angle to the supporting frame 5 and having their free ends connected by a horizontally disposed shaft 13. The arms 12 and shaft 13 together constitute a carrier upon which is mounted a reversible flask carrying table 14.

The flask carrying table comprises a pair of horizontally disposed arms having their intermediate portions provided with alined openings for the reception of the shaft 13 and their opposite ends formed with inwardly extending fingers 15 to which may be bolted or otherwise rigidly secured the pattern plate or board 16.

Secured to or formed integral with the arms of the table 14 are casings or housings 17 in which are journaled stub shafts 18 carrying a pair of pinions 19 and 20, the large pinions 19 being arranged to mesh with corresponding gears or pinions 21 secured to and mounted for rotation with the shaft 13.

The casings or housings 17 are provided with vertically alined openings in which are slidably mounted suitable racks 22, the teeth of which mesh with the teeth on the adjacent pinions 20. One end of each rack is provided with an angularly disposed arm 23 having pins extending inwardly therefrom and on which are journaled suitable rollers 24, which latter engage the drag board 25 of the flask and serve to clamp the latter in engagement with the body of the flask and thus prevent separation of the parts when the table 14 is reversed preparatory to lowering the mold.

Secured to the arms 12 of the carrier are segmental plates 26 which form guides for a locking bolt 27.

The locking bolt 27 is mounted in a casing or cylinder 28 secured to one of the arms 12 and is provided with an operating handle 29 by means of which the bolt 27 may be retracted against the tension of the spring 30 when it is desired to release the flask supporting table preparatory to revolving or reversing the same.

Secured to one end of the shaft 13 is a hand wheel 31 by means of which the shaft 13 may be revolved to effect the reversal of the flask supporting table and also to actuate the racks 22 to deposit the flask or mold on the ground.

In operation the carrier 12 is moved to the dotted line position shown in Fig. 3 of the drawings and the flask 25' placed in position on the pattern board 16 after which the wheel 31 is partly rotated which causes the pinion 21 to engage the pinion 19 and thus move the rollers 24 in engagement with the flask thereby to securely clamp the flask in position on the table. The operator then grasps the wheel 31 and rotates the carrier in a horizontal plane to the full line position shown in Fig. 3 of the drawings, after which the lever 29 is actuated to release the locking bolt 27 and the wheel 31 moved in the direction of the arrow which reverses the position of the table and moves the flask to a position directly above the open end of the supporting frame 5, the clamping members serving to prevent accidental displacement of the flask when reversing the position of the supporting table. The hand wheel 31 is then rotated in the opposite direction which causes the teeth on the pinions 20 to engage the teeth on the racks 22 and thus lower the flask or mold to the position shown in dotted lines in Fig. 4 of the drawings, the pattern plate or board 16 being held relatively stationary during the lowering operation. It will here be noted that when the supporting table is reversed the locking member or bolt 27 will ride over the segmental plate 26 until the reversal of the table is effected, in which event the spring 30 will force the bolt into one of the recesses 32 and thus prevent rotation or oscillation of the supporting table when the flask or mold is lowered. By moving the truck rearwardly the rollers 24 will slide over the drag board and thus leave the flask or mold on the ground. After the mold has been deposited on the ground the operator grasps the wheel 31 and turns the carrier in a horizontal plane to the dotted line position shown in Fig. 1 of the drawings, the lever 29 being then actuated to release the locking bolt so that the supporting table may be returned to its normal position, that is to say in position to receive another flask.

If desired, the rack and pinion mechanism for effecting the clamping and lowering of the flask may be dispensed with and suitable friction gears substituted in place thereof, without departing from the spirit of the invention.

Having thus described the invention what is claimed is:

1. A molding machine including a truck, a carrier mounted on the truck, a flask supporting table, a pattern movable with the table, and means mounted on the carrier for lowering the flask while the pattern remains relatively stationary.

2. A molding machine including a truck, a carrier mounted on the truck, a reversible flask supporting table, a pattern movable with the table, and means mounted on the carrier for lowering the flask while the pattern remains relatively stationary.

3. A molding machine including a frame, a carrier mounted for rotation in a horizontal plane on the frame, a reversible flask supporting table, a pattern movable with the table, and means for lowering the flask while the pattern remains relatively stationary.

4. A molding machine including a frame, a carrier mounted for rotation in a horizontal plane on the frame, a reversible flask supporting table, a pattern movable with the table, means for preventing accidental displacement of the flask when reversing the table, and means for lowering the flask while the pattern remains relatively stationary.

5. A molding machine including a truck, a carrier mounted for rotation on the truck, a reversible flask supporting table mounted on the carrier, means for locking the table in normal and reversed positions, and means for lowering the flask when the table is in reversed position.

6. A molding machine including a truck, a carrier, a reversible flask supporting table mounted for rotation on the carrier, means for clamping the flask on the table, and means for lowering the flask when the table is in reversed position.

7. A molding machine including a truck, a carrier mounted on the truck, a shaft journaled in the carrier, a reversible flask supporting table mounted on the shaft, clamping devices adapted to engage the flask and prevent accidental displacement of the same during the reversal of the table, and means carried by the shaft and coöperating with the clamping devices for lowering the flask when the shaft is rotated.

8. A molding machine including a truck, a carrier pivotally mounted for rotation in a horizontal plane on the truck, a shaft journaled in the carrier, a reversible flask supporting table mounted on the shaft, means for locking the table in normal and reverse positions, and means actuated by the shaft for lowering the flask when the table is in reversed position.

9. A molding machine including a truck, a carrier mounted for rotation on the truck, a shaft journaled in the carrier and provided with gears, a flask supporting table mounted on the shaft, casings secured to the table, gears journaled in the casings and meshing with the teeth of the gears on the shaft, pinions mounted for rotation with the gears in the casing, racks slidably mounted within the casing and engaging the teeth of the adjacent pinions, clamping devices carried by the racks and adapted to bear against the flask; and a hand wheel for rotating the shaft.

10. A molding machine including a truck, a carrier mounted for rotation on the truck, a shaft journaled in the casing and provided with spaced gears, a flask supporting table mounted on the shaft, a pattern plate secured to the table, casings carried by the table, racks mounted for vertical movement within the casing and provided with means for engagement with the flask, gears mounted for rotation in the casings and provided with pinions adapted to mesh with the teeth on the adjacent racks.

11. A molding machine including a truck having a substantially U shaped frame, a carrier mounted for rotation in a horizontal plane on the closed end of said frame, a reversible flask supporting table mounted on the carrier, a pattern carried by the table, and means for lowering the flask to a position on the ground at the open end of the supporting frame while the pattern remains relatively stationary.

12. A molding machine including a truck having a substantially U shaped supporting frame, a stud extending vertically from the closed end of the frame, a horizontal bar mounted for rotation on the stud and provided with oppositely disposed arms disposed at an angle to the frame of the truck, a shaft journaled in the ends of said arms, a reversible flask supporting table mounted on the shaft, means for locking the table against movement, a pattern secured to and movable with the table, and means for lowering the flask without effecting the movement of the pattern when the table is in reversed position.

In testimony that I claim the foregoing as my own, I have hereto affixed my signature in the presence of two witnesses.

MAX KARL WEIGEL.

Witnesses:
  T. A. MURPHY,
  I. C. ANDERSON.